Patented Sept. 20, 1932

1,878,966

UNITED STATES PATENT OFFICE

WALTER MIEG, OF OPLADEN, AND KURT BAMBERGER, OF ELBERFELD, GERMANY, ASSIGNORS TO GENERAL ANILINE WORKS, INC., OF NEW YORK, N. Y., A CORPORATION OF DELAWARE

WOOL-DYESTUFF OF THE DIANTHRAQUINONYLAMINE SERIES

No Drawing. Application filed May 29, 1930, Serial No. 457,528, and in Germany June 7, 1929.

The present invention relates to new acid wool-dyestuffs of the dianthraquinonylamine series and to a process of preparing same.

We have found that valuable new acid wool-dyestuffs of the dianthraquinonylamine series are obtainable by heating a compound of the probable formula:

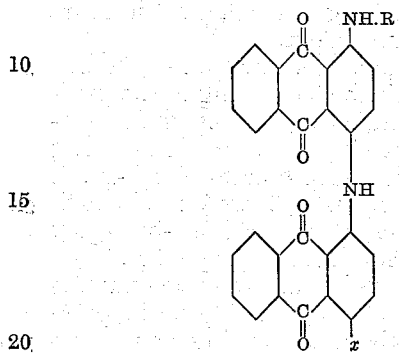

wherein R means hydrogen or alkyl, $x$ stands for hydrogen or the amino- or an alkylamino group, with fuming sulfuric acid in the presence of boric acid and in the presence of a small (catalytical) amount of mercury or an oxide or a salt thereof, such as mercuric oxide, mercuric sulfate, mercuric chloride, mercuric acetate, mercurous sulfate and the like.

The reaction is advantageously performed with a fuming sulfuric acid containing between 20–50% $SO_3$ and at a temperature between about 120–150° C., while applying boric acid in an amount corresponding to at least one molecular proportion upon one molecular proportion of the dianthraquinonylamine employed. The reaction will be finished as soon as a test portion, worked up in the usual manner, is soluble in cold water, which generally will be the case within about 2–4 hours. For working up the reaction mixture may be poured into water and the reaction product isolated by salting out.

The products thus obtainable form dark powders, easily soluble in water, dissolving in strong sulfuric acid with dark blue to bluish-green colorations, dyeing wool from an acid bath clear and strong greyish-blue to greenish-blue-grey shades of excellent fastness properties. The products probably are amino- or alkylamino-dianthraquinonylamine sulfonic acids, containing more sulfonic acid groups than the amino- or alkylamino-dianthraquinonylamine sulfonic acids hitherto known. As a result of this fact our new products are more easily soluble in water than the known compounds, in consequence of which they are valuable dyestuffs for dyeing wool strong shades. Further, they can be used in mechanical dyeing apparatus.

The following examples illustrate our invention without restricting it thereto, the parts being by weight.

Example 1

5 parts of 4-amino-1.1'-dianthraquinonylamine are introduced into 75 parts of fuming sulfuric acid of 27% $SO_3$ content, to which 2 parts of boric acid and 0,1 part of mercuric oxide have been added. The reaction mixture is heated, while stirring, to 135–140° C., until a test portion is easily soluble in water, which will be the case within about 3½ hours. After cooling, the reaction mixture is poured into 500 parts of water, containing some sulfurous acid, 200 parts of a saturated aqueous sodium chloride solution are added and the solution is boiled until the dyestuff has separated. A dark powder is thus obtained, easily soluble in water, dissolving in strong sulfuric acid with a greenish-blue coloration, dyeing wool from an acid bath clear greyish-blue shades of excellent fastness properties.

Example 2

10 parts of 4.4'-diamino-1.1'-dianthraquinonylamine are introduced into 150 parts of fuming sulfuric acid (27% $SO_3$ content), to which 4 parts of boric acid and 0,2 part of mercuric oxide have been added. The reaction mixture is heated to 135–140° C. for about 3 hours, while stirring, cooled, poured into 800 parts of water containing some sulfurous acid, and the dyestuff is salted out by the addition of 600 parts of a saturated aqueous sodium chloride solution and boiling. A dark powder is thus obtained being more easily soluble in water than the dyestuff of Example 1 of the German Patent No. 414,865. It dissolves in strong sulfuric acid with a dark blue coloration and dyes wool from an acid bath strong bluish-grey shades of excellent fastness properties.

Similar dyestuffs of somewhat greener shades are obtainable when starting with alkylamino - 1.1' - dianthraquinonylamines, for example, with 4-methyl- or ethylamino- 1.1'-dianthraquinonylamine or with 4.4'-dimethylamino-1.1'- dianthraquinonylamine and working in a similar manner as described in the examples.

We claim:—

1. Process which comprises heating a compound of the probable formula

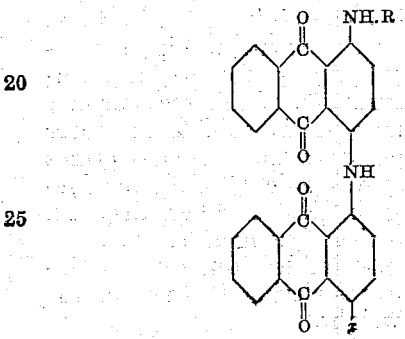

wherein R means hydrogen or alkyl, $x$ stands for hydrogen or a substituent of the group consisting of the amino group and alkylamino groups, with fuming sulfuric acid in the presence of boric acid and of a small amount of a compound of the group consisting of mercury, its oxides and salts.

2. Process which comprises heating a compound of the probable formula

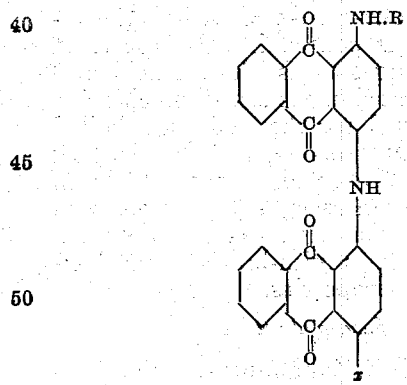

wherein R means hydrogen or alkyl, $x$ stands for hydrogen or a substituent of the group consisting of the amino group and alkylamino groups, with fuming sulfuric acid of about 20-50% $SO_3$ content, at a temperature between about 120-150° C., in the presence of boric acid in an amount corresponding to at least one molecular proportion based upon one molecular proportion of the starting material employed, and in the presence of a small amount of a compound of the group consisting of mercury, its oxides and salts, until a test portion, after working up in the usual manner, is soluble in cold water.

3. Process which comprises reacting upon 4.4' - diamino - 1.1' - dianthraquinonylamine with fuming sulfuric acid of about 20-50% $SO_3$ content, at a temperature between about 120-150° C., in the presence of boric acid in an amount corresponding to at least one molecular proportion based upon one molecular proportion of the starting material employed, and in the presence of a small amount of a compound of the group consisting of mercury, its oxides and salts, until a test portion, after working up in the usual manner, is soluble in cold water.

4. Process which comprises reacting upon 10 parts by weight of 4.4'-diamino-1.1'-dianthraquinonylamine with 150 parts by weight of fuming sulfuric acid of 27% $SO_3$ content, containing 4 parts by weight of boric acid and 0,2 part by weight of mercuric oxide, at a temperature of 135-140° C. for about three hours, pouring the reaction mixture into water and salting out.

5. The sulfonated dianthraquinonylamine derivatives obtainable according to the process claimed in claim 1, forming dark powders, easily soluble in water, soluble in strong sulfuric acid with dark blue to bluish-green colorations, dyeing wool from an acid bath strong greyish-blue to greenish-blue-grey shades of excellent fastness properties.

6. The sulfonated dianthraquinonylamine derivatives obtainable according to the process claimed in claim 2, forming dark powders, easily soluble in water, soluble in strong sulfuric acid with dark blue to bluish-green colorations, dyeing wool from an acid bath strong greyish-blue to greenish-blue-grey shades of excellent fastness properties.

7. The sulfonated dianthraquinonylamine derivatives obtainable according to the process claimed in claim 3, forming dark powders, easily soluble in water, soluble in strong sulfuric acid with dark blue to bluish-green colorations, dyeing wool from an acid bath strong greyish-blue to greenish-blue-grey shades of excellent fastness properties.

8. The sulfonated 4.4'-diamino-1.1'-dianthraquinonylamine obtainable according to the process claimed in claim 4, being a dark powder, easily soluble in strong sulfuric acid with a dark blue coloration, dyeing wool from an acid bath strong bluish-grey shades of excellent fastness properties.

In testimony whereof, we affix our signatures.

WALTER MIEG.
KURT BAMBERGER.